US011201909B1

(12) United States Patent
Choudhary et al.

(10) Patent No.: US 11,201,909 B1
(45) Date of Patent: Dec. 14, 2021

(54) NETWORK SENSITIVE FILE TRANSFER

(71) Applicant: Citrix Systems, Inc., Fort Lauderdale, FL (US)

(72) Inventors: Shubham Choudhary, Karnataka (IN); Aayush Bhala, Karnataka (IN); Praveen Raja Dhanabalan, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/014,167

(22) Filed: Sep. 8, 2020

(51) Int. Cl.
*G06F 15/173* (2006.01)
*H04L 29/08* (2006.01)
*H04L 12/26* (2006.01)
*H04L 12/24* (2006.01)
*H04L 12/911* (2013.01)

(52) U.S. Cl.
CPC ............ *H04L 67/06* (2013.01); *H04L 41/147* (2013.01); *H04L 43/08* (2013.01); *H04L 47/821* (2013.01); *H04L 47/822* (2013.01); *H04L 67/18* (2013.01)

(58) Field of Classification Search
CPC ....... H04L 67/06; H04L 41/147; H04L 43/08; H04L 47/821; H04L 47/822; H04L 67/18
USPC ....................................................... 709/224
See application file for complete search history.

(56) References Cited

U.S. PATENT DOCUMENTS

| | | | |
|---|---|---|---|
| 2004/0181545 A1* | 9/2004 | Deng | G11B 27/105 |
| 2005/0172232 A1* | 8/2005 | Wiseman | H04L 67/36 715/718 |
| 2006/0036514 A1* | 2/2006 | Steelberg | H04H 60/51 705/28 |
| 2009/0164603 A1* | 6/2009 | Harrang | H04L 1/0038 709/217 |
| 2012/0210325 A1* | 8/2012 | de Lind van Wijngaarden | G06F 1/329 718/103 |
| 2014/0114920 A1* | 4/2014 | Zhang | H04L 67/06 707/634 |
| 2015/0199414 A1* | 7/2015 | Braginsky | G06F 16/172 707/613 |

\* cited by examiner

*Primary Examiner* — Atta Khan
(74) *Attorney, Agent, or Firm* — Banner & Witcoff, Ltd.

(57) ABSTRACT

Methods and systems for transmitting files based on network conditions are described herein. Network conditions of a network that connects a first computing device and a second computing device may be determined. A usage pattern of one or more users may be determined. Based on the network conditions, a first priority level of a first file, and/or the usage pattern, a first file may be sent from the first computing device to the second computing device. Based on the network conditions, a second priority level of a second file, and/or the usage pattern, a delay period may be determined for the second file, and transmission of the second file may be delayed. The first computing device may send a summary of the second file to the second computing device.

20 Claims, 5 Drawing Sheets

NETWORK SENSITIVE FILE TRANSFER

FIELD

Aspects described herein generally relate to computer networking, remote computer access, file handling and transfer, and hardware and software related thereto. More specifically, one or more aspects describe herein provide for intelligent transmission of files based on network conditions.

BACKGROUND

Many organizations are now distributed across the globe, which can create unique issues from a file management standpoint. For example, an organization may have offices in India and in Canada, and both may be tasked with working on similar files (e.g., as part of a programing project). In this manner, when the organization's team in India has completed their work day, the team in Canada may be starting their day and beginning where the Indian team left off. From a network's perspective, such hand-off periods can result in huge spikes of activity, as the files from storage in India may be transferred to storage in Canada while users in Canada are simultaneously using their local network to log in, send e-mails, and the like. This may cause significant delays in the network, and can cause delay as users in Canada may be forced to wait on transfers to complete before beginning their work day.

This problem is complicated by the fact that not all traffic is equally important during the aforementioned hand-off period between different global teams. As a simple example, many users begin their work day by reading the news, whereas others begin by checking their e-mails. From an organizational perspective, the latter (work-related) traffic is arguably more important than the former (less work-related) traffic. As such, network spikes during hand-off periods might delay important traffic just as much, if not more, as unimportant traffic.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards intelligent file transfers based on network load.

A bandwidth of a network that connects a first computing device and a second computing device may be determined. The first computing device may be, for example, located in India, whereas the second computing device may be, for example, located in Canada. A plurality of files for transfer from the first computing device to the second computing device may be determined. For example, such files may have been created, modified, or otherwise edited during the work day in India, and may be prepared for transfer to Canada for the beginning of their work day. Based on the bandwidth and a first priority level of a first file of the plurality of files, the first computing device may be caused to transmit, to the second computing device, the first file. For example, the first file may be particularly important, such that it may be transferred as soon as possible. And, based on the bandwidth and a second priority level of a second file of the plurality of files, the first computing device may be caused to delay transmission, to the second computing device, of the second file for a time period. Such a delay may be because, for example, the second file is not very important for the workday in Canada, the file is not very often used by users in Canada, or the like. In this manner, network bandwidth for transfer of the plurality of files may be intelligently allocated.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
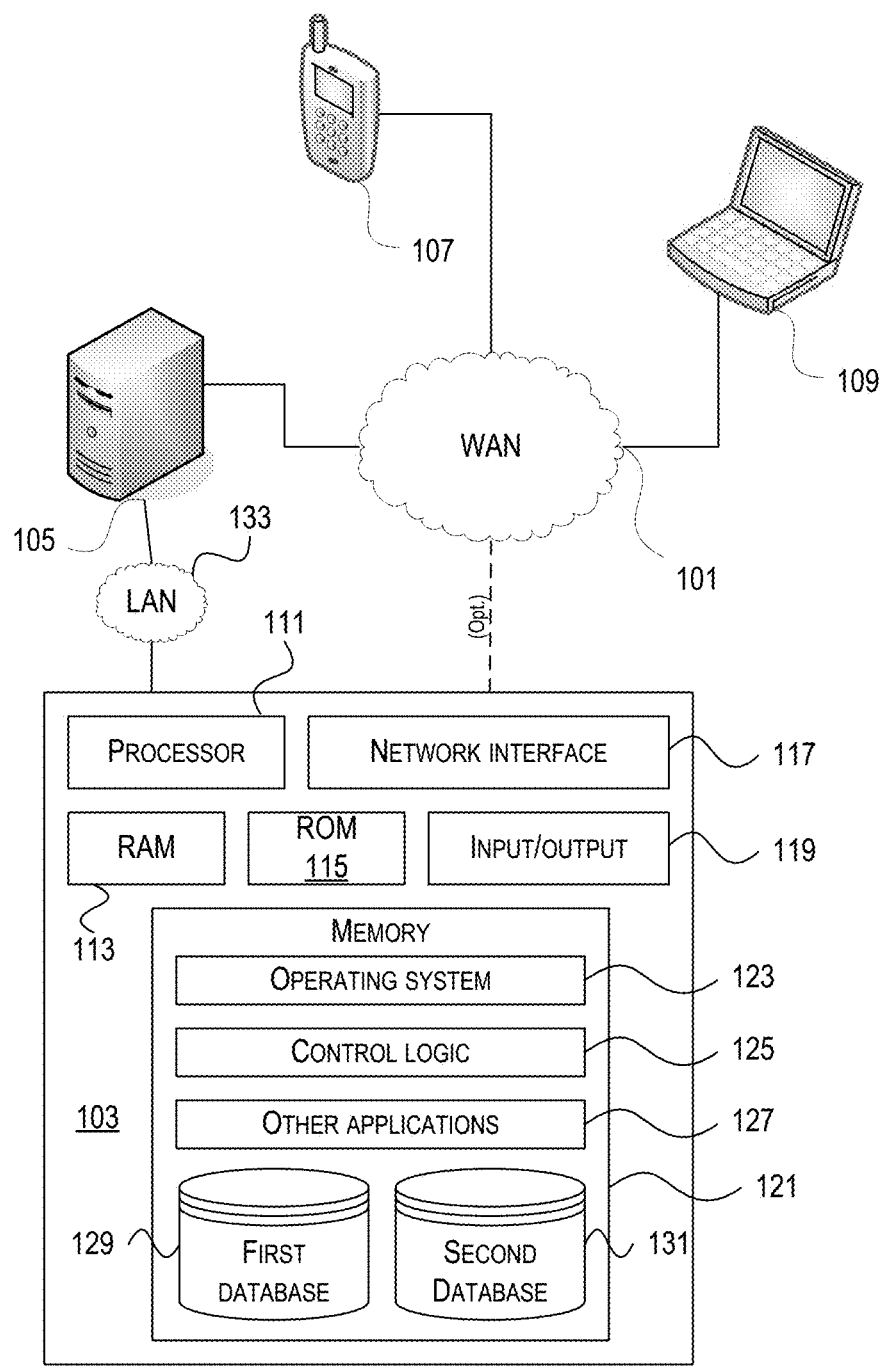
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards network-sensitive file transfer. A bandwidth of a network that connects a first computing device and a second computing device may be determined. Determining the bandwidth may comprise predicting the bandwidth at a future time, such as when transfer of a first file and a second file is scheduled. A plurality of files for transfer from the first computing device to the second computing device may be determined. Based on the bandwidth and a first priority level of a first file of the plurality of files, the first computing device may be caused to transmit, to the second computing device, the first file. And, based on the bandwidth and a second priority level of a second file of the plurality of files, the first computing device may be caused to delay transmission, to the second computing device, of the second file for a time period. The second priority level may be based on a time when the second file was uploaded to the first computing device. The second priority level may additionally and/or alternatively be based on a number of times the second file has been accessed. A relevance of the second file to a user of the second computing device may be determined, and the second priority level may be based on the relevance. A geographical location of the second computing device may be determined, and the second priority level may be based on the geographical location. An updated bandwidth corresponding to the network may be determined, and, based on the updated bandwidth, the first computing device may be caused to transmit, to the second computing device, the second file before the time period has elapsed. Based on a third priority level of a third file of the plurality of files, a threshold may be determined and, based on the bandwidth satisfying the threshold, the first computing device may be caused to delay transmission, to transmit, to the second computing device, the third file. The second computing device may be caused to display, during the time period, an indication that the second file is unavailable. A request for the second file may be received by the second computing device and, based on the request, the first computing device may be caused to transmit the second file before the time period has elapsed.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
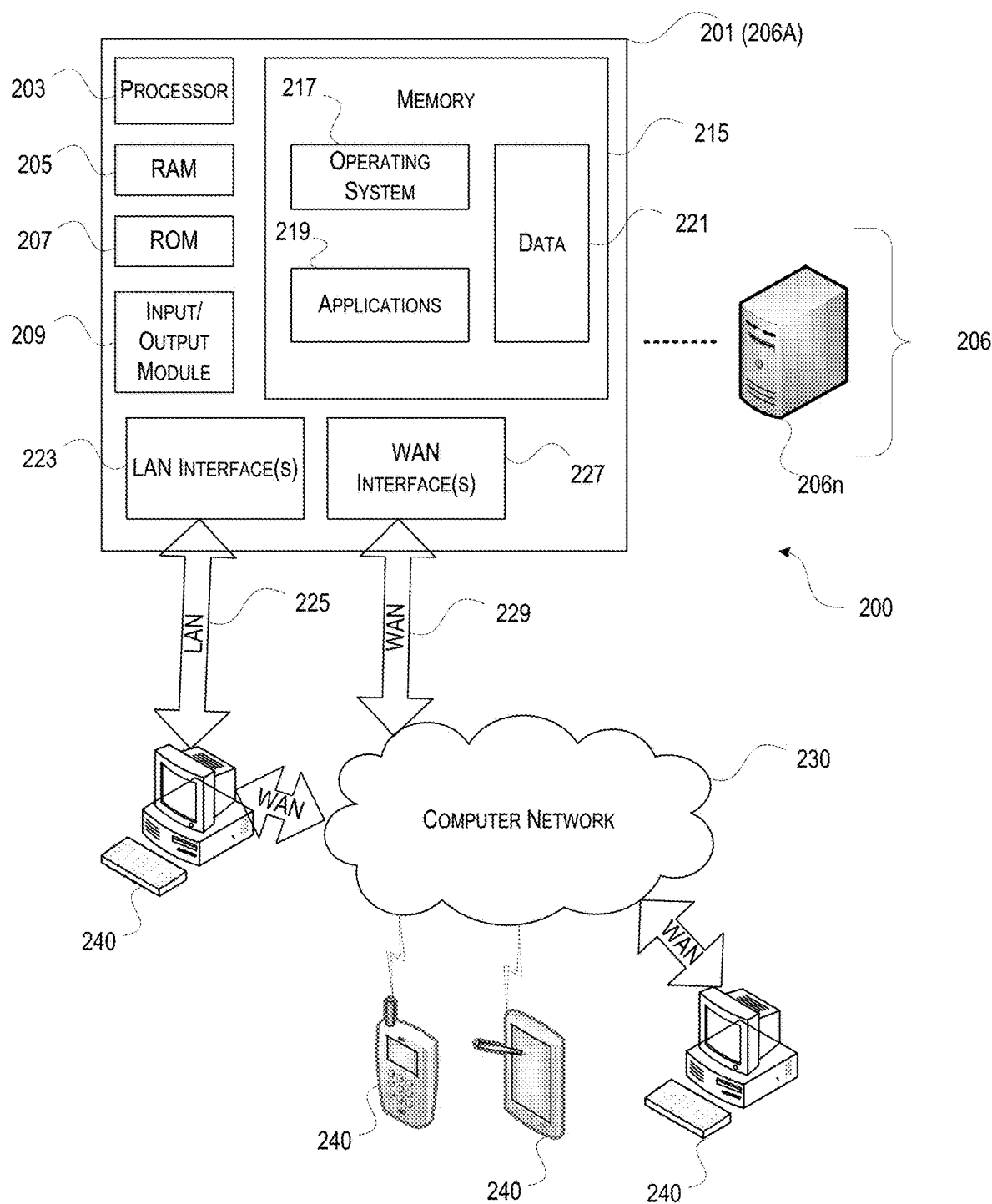
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
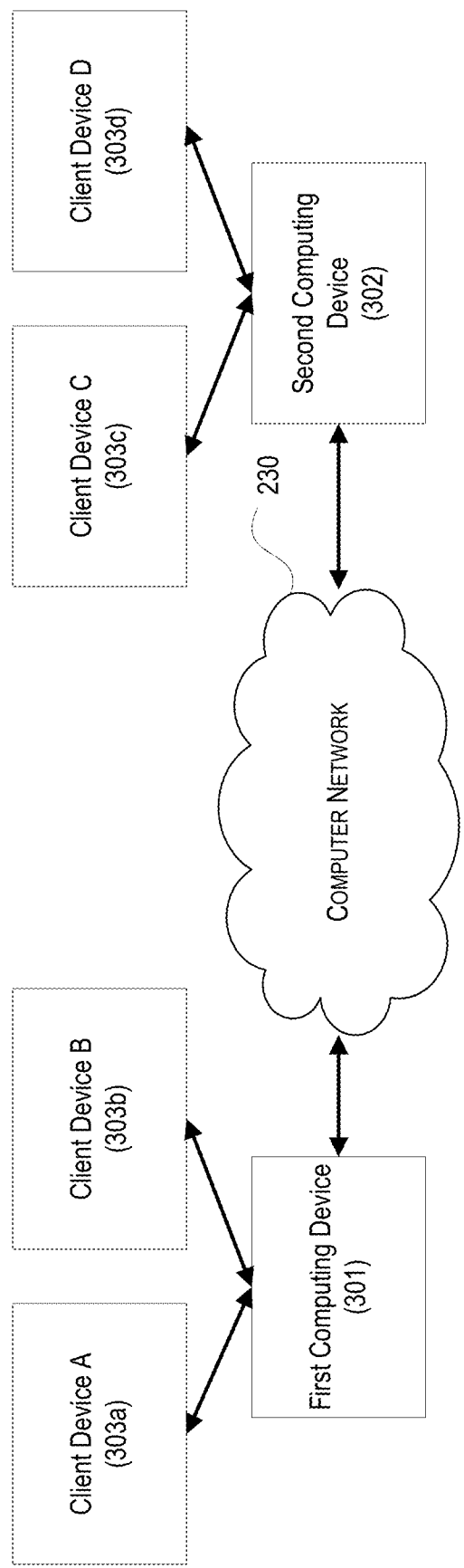
FIG. 3 shows a diagram of multiple computing devices connected via a network.

FIG. 3 shows a diagram of multiple computing devices connected via the network 230. The network 230, which may be the same or similar as the network 230 of FIG. 2, is shown connecting a first computing device 301 and a second computing device 302. The first computing device 301 is shown communicatively coupled to a client device A 303a and a client device B 303b. The second computing device 302 is shown communicatively coupled to the client device C 303c and the client device D 303d. Any of the computing devices, such as the first computing device 301, the second computing device 302, the client device A 303a, the client device B 303b, the client device C 303c, and the client device D 303d, may be the same or similar to the network nodes 103, 105, 107, and/or 109, the client machine 240, or the like.

The first computing device 301 and the second computing device 302 may be computing devices configured to store files. The first computing device 301 and the second computing device 302 may be in different geographical locations, and may exchange files (e.g., send files to one another, whether on a continual or periodic basis). For example, the first computing device 301 and the second computing device 302 may be servers configured to store code for an organization, and the first computing device 301 and the second computing device 302 may be configured to store the same code, such that, when the first computing device 301 receives an update to the code, it may transfer the update via the network 230 to the second computing device 302.

The files stored by the first computing device 301 and the second computing device 302 need not be any particular type or format of files. The files may be of any size. The files may be stored on the first computing device 301 and the second computing device 302 such that the client devices 303a-303d need not store the files. For example, the files may be extremely large and used for video editing (e.g., for a movie), such that it may be more efficient to store the files on centralized computing devices as opposed to the relatively more limited space available on the client devices 303a-303d. Additionally and/or alternatively, the files may be stored on the first computing device 301 and the second computing device 302 for security and/or efficiency reasons.

The client devices, such as the client device A 303a, the client device B 303b, the client device C 303c, and the client device D 303d, may be computing devices used by users. Such client devices may be capable of reading, writing to, editing, and/or otherwise accessing files stored by the first computing device 301 and/or the second computing device 302. The client device A 303a and the client device B 303b may be configured to access files from the first computing device 301, and the client device C 303c and the client device D 303d may be configured to access files from the second computing device 302. This may be because, for example, the first computing device 301 may be geographically closer to the client device A 303a and the client device B 303b, whereas the second computing device 302 may be geographically closer to the client device C 303c and the client device D 303d.

The first computing device 301 and the second computing device 302 may be in different locations and may correspond to, for example, different time zones. For example, the first computing device may be located in India, whereas the second computing device may be located in Canada. As such, the client devices 303a-303d may access (and, e.g., change) files stored by the first computing device 301 and the second computing device 302 at different times. For example, the client device A 303a and the client device B 303b may provide edits to code on the first computing device 301 during the workday in India, whereas the client device C and the client device D may provide edits to code on the second computing device 302 during the workday in Canada.

The first computing device 301 and the second computing device 302 may be configured to transfer files to each other such that the servers maintain the same plurality of files. For example, the first computing device 301 may be configured to compare the edit date of a first file on the first computing device 301 with a corresponding second file on the second computing device 302. If the first file is newer than the second file, then the first computing device 301 may send the first file to the second computing device 302 to replace the second file. In contrast, if the second file is newer than the first file, then the first computing device 301 may request and retrieve the second file from the second computing device 302 to replace the first file. Replacement need not necessarily mean deletion: for example, the newer file may simply be saved as a latest version. Such a process may occur on a regular or periodic basis and/or responsive to a triggering event. As examples of a periodic basis, such a process may be performed at the end of a workday, every hour, at the end of a month, or the like. Triggering events may comprise, for example, when one of the client devices checks in a file (e.g., finishes making edits to the file), when one or more of the client devices commit changes to a particular file, when an administrator requests the process to be performed, or the like.

Network Sensitive File Transfer

Figure 4:
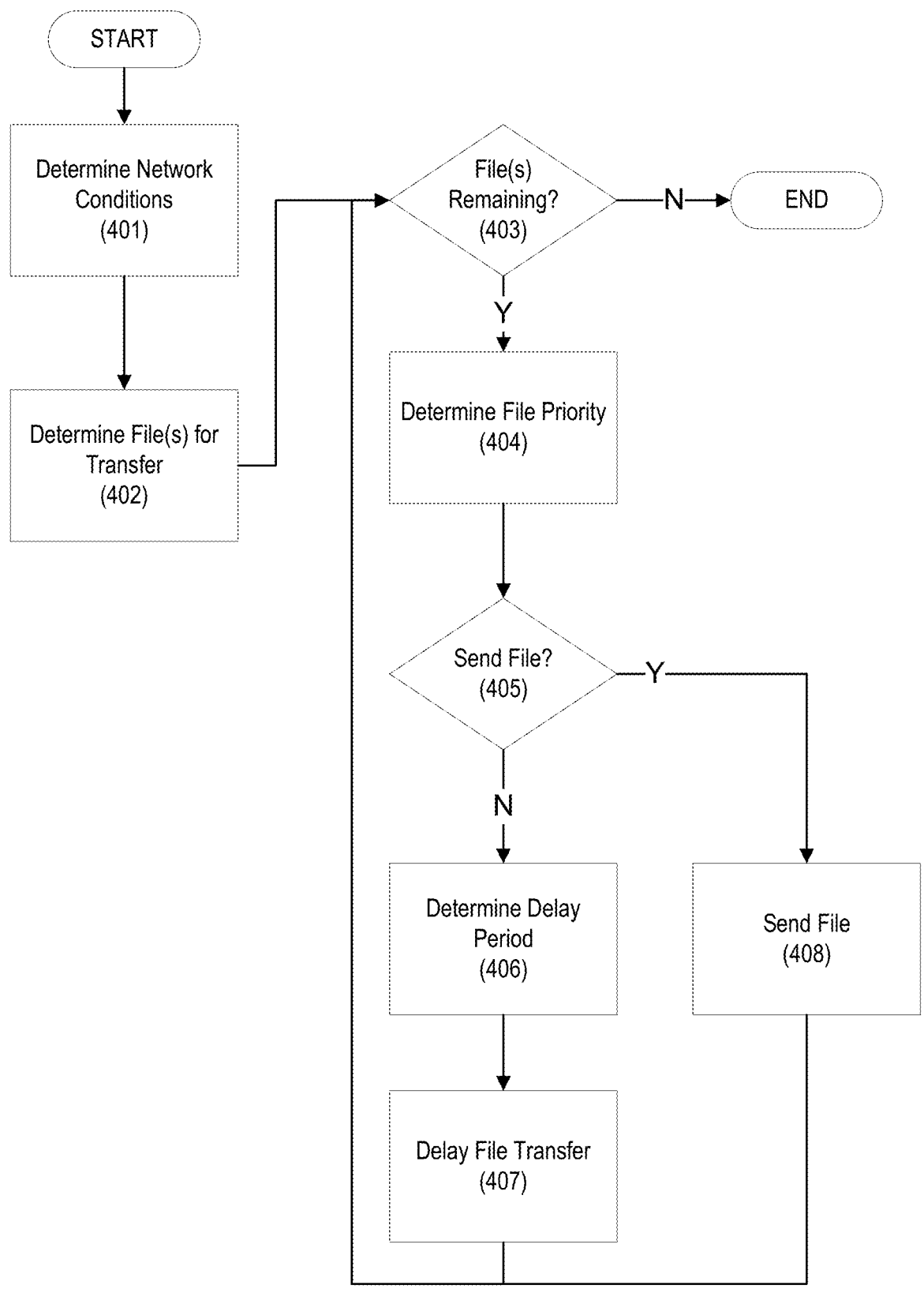
FIG. 4 is a flow chart depicting steps for file transfer.

FIG. 4 is a flow chart depicting steps for file transfer. The steps depicted in FIG. 4 may be performed by a computing device, such as the network nodes 103, 105, 107, and/or 109, the client machine 240, the first computing device 301, the second computing device 302, or the like. A computing device may comprise one or more processors and memory storing instructions that, when executed by the one or more processors, cause performance of any of the steps shown in FIG. 4. The steps shown in FIG. 4 are illustrative, and may be rearranged. For example, step 402 may be performed before step 401.

In step 401, network conditions may be determined. Network conditions may comprise any subjective or objective evaluation of a network, such as the computer network 230, or any portion thereof. For example, the network conditions may comprise latency, bandwidth, lag, subjective measurements of user experience, or the like. The network conditions may correspond to intranets, such as an intranet connecting the client device A 303a, the client device B 303b, and the first computing device 301. The network conditions may correspond to the Internet. The network conditions may correspond to a peak load of a network, such as the network 230.

Determining the network conditions may comprise receiving, from one or more computing devices, indications of the network conditions. For example, intermediary devices (e.g., routers, switches, and/or other computing devices located in the network 230) may be configured to report (e.g., periodically or upon request) network condition information to computing devices (e.g., the first computing device 301 and/or the second computing device 302). As such, the network conditions may correspond to all or portions of the network 230, and may be updated on a regular or periodic basis.

Determining the network conditions may comprise predicting all or portions of the network conditions. Because the network 230 may be large or otherwise very complex, definitively determining network conditions of the network 230 may be difficult. As such, all or portions of the network conditions may be predicted based on, e.g., historic network conditions, a time of day, a predicted activity of users of one or more geographic locations, or the like.

Determining the network conditions may comprise predicting the network conditions at a time when transfer of a plurality of files is expected. Certain periods of times (e.g., the end of a workday, the beginning of a workday) may be associated with the transfer of one or more files. Determining the network conditions may comprise predicting network conditions during one or more of those periods of time. As indicated above, prediction may be based on, e.g., historic network conditions during the time period, a predicted activity of users of one or more geographic locations during the time period, or the like.

Determining the network conditions may comprise training a recurrent neural network model on a time series data associated with network load. This process may comprise accessing different servers in a network and/or determining geographical locations of the servers. Such time series data may permit a neural network (e.g., a machine learning model) to learn the way a network is being used and how it may experience loads in different time periods. Using such training data, the neural network may be configured to predict future network load.

In some circumstances, if the network conditions satisfy a threshold (e.g., one associated with very low network use), the flow chart may end. For example, if the network load is so minimal as to be inconsequential, then steps depicted herein may be partially omitted. That said, it may nonetheless be desirable to continue with the process because network conditions can rapidly change.

In step 402, one or more files for transfer between two computing devices may be determined. Determining the files may comprise determining one or more files on one computing device are newer (e.g., more recently edited) than corresponding files stored on another computing device. For example, one computing device (e.g., the first computing device 301) may store files that have been more recently edited as compared to files stored on another computing device (e.g., the second computing device). That said, in some embodiments, the files need not be new to be transferred. For example, a computing device may be configured to transfer a plurality of files to a second computing device, whether or not those files have been edited.

In step 403, it is determined whether there are any files remaining for transfer. This decision may thereby begin a loop that iterates through the files determined in step 402. If there are files remaining, the flow chart may proceed to step 404. Otherwise, the flow chart may end.

In step 404, a priority of the file is determined. Determining the priority of the file may comprise determining a priority level, such as a numeric representation of the priority of the file (e.g., as compared to other files). The priority of the file may be any objective or subjective evaluation of the importance of transfer of a file. For example, the priority level may be determined based on one or more of: the time a file was uploaded, the number of downloads and/or views of the file, the identity of one or more teams that viewed the file, the relevance of the file to a user, the geographical location of the computing device hosting the file (or a user which may receive the file), or the like. The priority may be based on the frequency with which users (e.g., users of the client devices 303a-303d) access the file, the newness of the file, the last modified date of the file (as, e.g., indicated by an operating system), or the like. For example, a priority level may be based on a time when a file was uploaded to a computing device, a number of time the file has been accessed (whether on the same computing device or other computing devices), or the like.

Determining the priority of a file may be based on a relevance, to a user, of the file. Users may use files for different purposes: for example, for a programming project, certain files (e.g., audio assets) might not be used as often as other files (e.g., code files which are repeatedly edited by developers). As such, relevance may relate to the likelihood that one or more users will use the file during a period of time. For example, a user might access certain first files in the morning and second files in the evening, such that transferring the first files before the second files may provide that user a better experience overall.

Determining the priority of a file may be based on a geographical location of a device sending and/or receiving the file. Properties of a geographic location may affect whether certain files should be transferred before others. For example, a first geographic location may comprise an office mostly comprising programmers, such that transferring, to a computing device in that first geographic location, files useful to the programmers (e.g., new code repositories) may be more important than transferring files useful to graphic designers (e.g., art assets).

Determining the priority of a file may comprise training a machine learning model (e.g., a neural network) to predict the priority of a file. When a file is accessed by a user, data associated with that use may be generated and stored. The generated and stored data may be provided to train a machine learning model. The trained machine learning model may be used to predict, for other files, a priority of the file. For example, the trained machine learning model may be configured to predict a likelihood that a file will be accessed during a particular time period.

In step 405, it is determined whether to send the file. Determining whether to send the file may be based on, among other considerations, the network conditions determined in step 401 and the file priority determined in step 404. In this context, the determination need not be to not send the file at all, but, as discussed more below, may instead reflect a determination to delay transfer of the file for a delay period. If the file is to be transferred, the flow chart proceeds to step 408. Otherwise, the process proceeds to step 406.

The determination of whether to send a file may be based on whether the network conditions determined in step 401 satisfy a threshold. For example, if the network conditions are particularly bad, only the highest-priority files may be sent. As another example, if the network conditions are particularly good, then a broad set of high- and low-plurality files may be sent. Such a threshold may be established by an administrator based on, for example, desired user experiences. For example, the threshold may be established to minimize user frustrations relating to a slow network and user frustrations associated with not having immediate access to files.

In step 406, based on determining to not send the file, a delay period may be determined. The delay period may comprise a time period during which sending of the file is to be delayed. The delay period may be based on, for example, the network conditions determined in step 401, the file priority determined in step 404, or the like. For example, a high priority file may be delayed for less time than a low priority file. As another example, a file may be delayed for longer based on a determination that the network conditions indicate a very congested network.

In step 407, transfer of the file may be delayed based on the delay period. For example, if the delay period is three minutes, then transfer of the file may be delayed three minutes. After the delay period is expired, the file may be sent.

As part of step 407, the file may no longer be delayed based on updated bandwidth corresponding to the network. For example, during step 407, a system may monitor the network conditions of a network. If those network conditions satisfy a threshold (e.g., improve to a certain point), then the file may be transferred before the delay period in step 406 has elapsed. This may be advantageous where the delay period is configured to free up all or portions of the network, but where the network nonetheless becomes unexpectedly able to transfer the file.

During the delay in step 407, the receiving computing device may display an indication that the file is unavailable. For example, in an operating system, the file may be displayed as greyed out or otherwise temporarily unavailable. The computing device to receive the file may be configured to display information associated with the delay period, such as a time remaining until the file is transferred.

During the delay in step 407, the receiving computing device may receive a summary of the file to be transferred. The summary may be, for example, a thumbnail, description, metadata, header information, or the like. For example, the file may comprise a very large image, and the summary may comprise a small thumbnail of the image. As another example, the file may comprise a very large e-mail, and the summary may be the first few lines of text from the e-mail. As such, as part of the delay in step 407, the summary may be transferred in lieu of the actual file.

In step 408, based on determining to send the file, the file may be sent. Sending the file may comprise transmitting the file to one or more computing devices.

After steps 407 and/or 408, the flow chart may return to step 403, where it may be determined if additional files (e.g., of the one or more files determined in step 402) are to be transferred.

Figure 5:
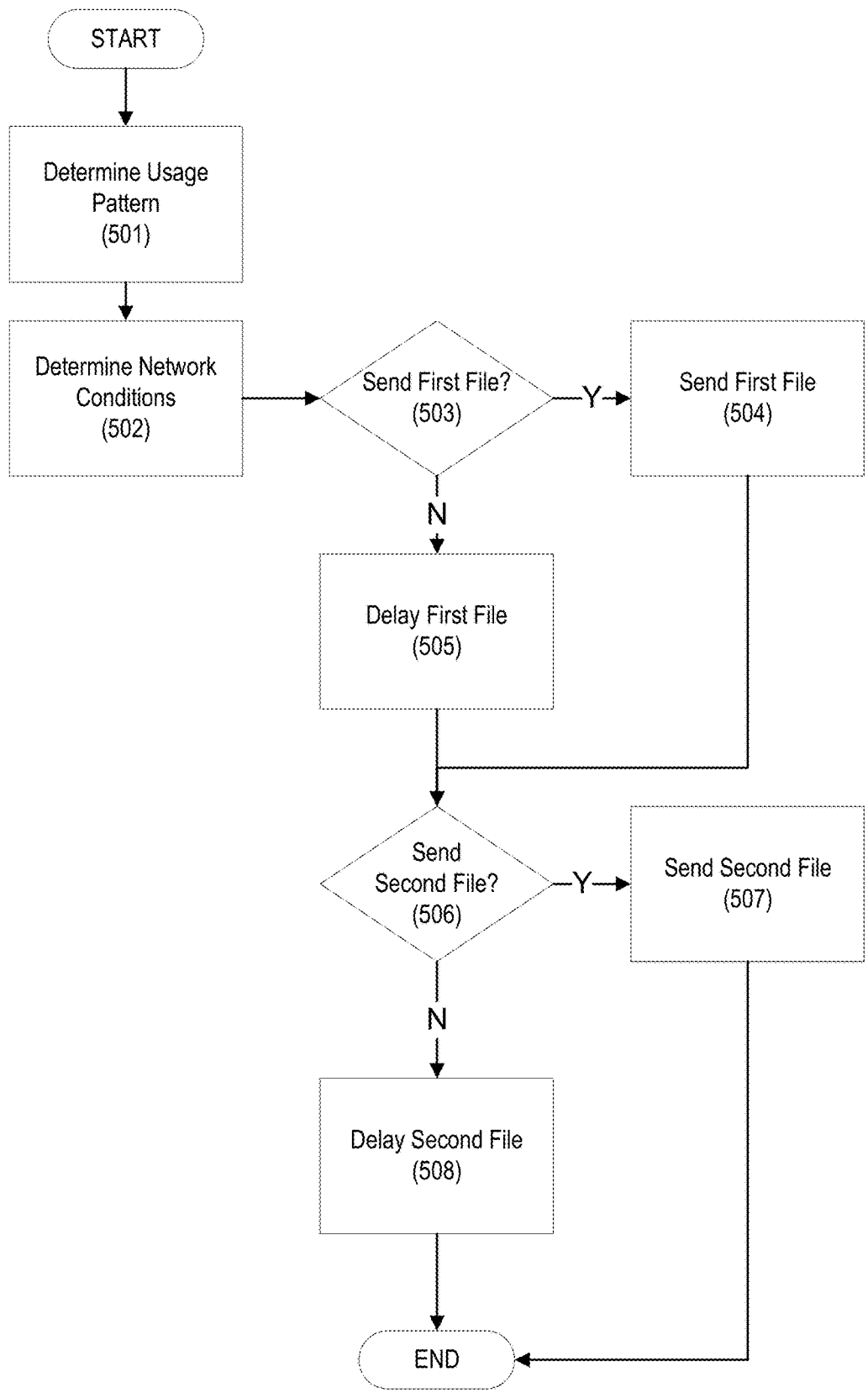
FIG. 5 is a different flow chart depicting steps for file transfer.

FIG. 5 is a flow chart depicting steps for file transfer. As with FIG. 4, the steps depicted in FIG. 5 may be performed by a computing device, such as the network nodes 103, 105, 107, and/or 109, the client machine 240, the first computing device 301, the second computing device 302, or the like. A computing device may comprise one or more processors and memory storing instructions that, when executed by the one or more processors, cause performance of any of the steps shown in FIG. 5. The steps shown in FIG. 4 are illustrative and may be rearranged. For example, step 502 may be performed before step 501.

In step 501, a usage pattern may be determined. The usage pattern may be for one or more users, and may relate to use, by the one or more users, of one or more applications. For example, the usage pattern may indicate, for one or more users and one or more time periods, how the one or more users may use one or more applications. The expected usage pattern may pertain to use of one or more files. For example, a user may be predicted to access one or more files based on a prediction that the user will use one or more applications.

Determining the usage pattern may comprise predicting that a user will use one or more applications during a time period. For example, at the beginning of a work day, a user may regularly open an e-mail application, a graphic design application, and a web browser application. This activity may indicate that certain files (e.g., those used by the e-mail application, graphic design application, and/or the web browser application) are of higher priority to the user than other files, at least with respect to the beginning of their work day.

Determining the usage pattern may comprise receiving application information from an operating system of one or more computing devices. For example, a computing device may periodically report which applications, of a plurality of applications, are being used during particular time periods. Such information may indicate, for example, a type of application (e.g., text editing, e-mail, spreadsheets, etc.), and the like.

In step 502, network conditions may be determined. This step may be the same or similar as step 401 of FIG. 4. The network conditions may be based on the usage pattern. For example, the usage pattern may indicate high network activity by the user, such that the network conditions may reflect that high network activity.

In step 503, it is determined whether to send a first file. Determining whether to send the first file may be based on the usage pattern, the network conditions, and/or a priority of the first file. As part of step 503, the priority of the first file may be determined. If the first file should be sent, the flow chart proceeds to step 504. Otherwise, the flow chart proceeds to step 505.

In step 504, if the first file should be sent, the first file is sent. This step may be the same or similar as step 408 of FIG. 4.

In step 505, the first file may be delayed. This step may be the same or similar as steps 406 and 407 of FIG. 4. For example, as described with regard to those steps, the first file may be delayed based on a first delay period, a summary of the first file may be sent to the receiving computing device, and/or the receiving computing device may be configured to display an indication that the first file is unavailable until the first delay period has elapsed.

In step 506, it is determined whether to send a second file. Determining whether to send the second file may be based on the usage pattern, the network conditions, and/or a priority of the second file. As part of step 506, the priority of the second file may be determined. If the second file should be sent, the flow chart proceeds to step 507. Otherwise, the flow chart proceeds to step 508.

In step 507, if the second file should be sent, the second file is sent. This step may be the same or similar as step 408 of FIG. 4.

In step 508, the second file may be delayed. This step may be the same or similar as steps 406 and 407 of FIG. 4. For example, as described with regard to those steps, the second file may be delayed based on a second delay period, a summary of the second file may be sent to the receiving computing device, and/or the receiving computing device may be configured to display an indication that the second file is unavailable until the second delay period has elapsed.

The steps depicted in FIG. 5 may result in two different files being treated differently. For example, the first file may be delayed, whereas the second file may be sent. Such differential handling may be the result of, for example, a difference in priority between the first file and the second file. As another example, both files may be delayed, but with different delay periods that reflect differences of priority levels of the files.

The following paragraphs (M1) through (M20) describe examples of methods that may be implemented in accordance with the present disclosure.

(M1) A method comprising determining a bandwidth of a network that connects a first computing device and a second computing device; determining a plurality of files for transfer from the first computing device to the second computing device; causing, based on the bandwidth and a first priority level of a first file of the plurality of files, the first computing device to transmit, to the second computing device, the first file; and causing, based on the bandwidth and a second priority level of a second file of the plurality of files, the first computing device to delay transmission, to the second computing device, of the second file for a time period.

(M2) A method may be performed as described in paragraph (M1) wherein the second priority level is based on a time when the second file was uploaded to the first computing device.

(M3) A method may be performed as described in paragraph (M1) wherein the second priority level is based on a number of times the second file has been accessed.

(M4) A method may be performed as described in paragraph (M1) further comprising: determining a relevance of the second file to a user of the second computing device, wherein the second priority level is based on the relevance.

(M5) A method may be performed as described in paragraph (M1) further comprising: determining a geographical location of the second computing device, wherein the second priority level is based on the geographical location.

(M6) A method may be performed as described in paragraph (M1) further comprising: determining an updated bandwidth corresponding to the network; and causing, based on the updated bandwidth, the first computing device to transmit, to the second computing device, the second file before the time period has elapsed.

(M7) A method may be performed as described in paragraph (M1) further comprising: determining, based on a third priority level of a third file of the plurality of files, a threshold; and causing, based on the bandwidth satisfying the threshold, the first computing device to delay transmission, to the second computing device, the third file.

(M8) A method may be performed as described in paragraph (M1) further comprising: causing, during the time period, the second computing device to display an indication that the second file is unavailable.

(M9) A method may be performed as described in paragraph (M1) wherein determining the bandwidth comprises predicting the bandwidth at a future time when transfer of the first file and the second file is scheduled.

(M10) A method may be performed as described in paragraph (M1) further comprising: receiving, from the second computing device, a request for the second file; and causing, based on the request, the first computing device to transmit, to the second computing device, the second file before the time period has elapsed.

(M11) A method comprising determining a usage pattern of a user of a first computing device during a time period; predicting a bandwidth of a network during the time period, wherein the network connects the first computing device and a second computing device, wherein the second computing device stores a plurality of files; causing, based on the bandwidth, the usage pattern, and a first priority of a first file of the plurality of files, the second computing device to transmit, to the first computing device, the first file; and causing, based on the bandwidth, the usage pattern, and a second priority level of a second file of the plurality of files, the second computing device to delay transmission, to the first computing device, of the second file for a second time period.

(M12) A method may be performed as described in paragraph (M11) wherein predicting the bandwidth of the network is based on the usage pattern of the user of the first computing device during the time period.

(M13) A method may be performed as described in paragraph (M11) wherein the second priority level is based on one or more of: a time when the second file was uploaded to the second computing device; or a number of times the second file has been accessed.

(M14) A method may be performed as described in paragraph (M11) wherein the time period is based on the second priority level.

(M15) A method may be performed as described in paragraph (M11) further comprising: receiving, from the first computing device, a request for the second file; and causing, based on the request, the second computing device to transmit, to the first computing device, the second file before the time period has elapsed.

(M16) A method may be performed as described in paragraph (M11) wherein determining the usage pattern comprises: determining one or more applications that are predicted to be used by the user during the time period, wherein the second priority is based on determining that the one or more applications is configured to use the second file.

(M17) A method comprising determining a bandwidth of a network that connects a first computing device and a second computing device, wherein the second computing device stores a plurality of files; causing, based on the bandwidth and a first priority level of a first file of the plurality of files, the first computing device to transmit, to the second computing device, the first file; based on the bandwidth and a second priority level of a second file of the plurality of files: causing the first computing device to send, to the second computing device, a summary of the second file; and instructing the first computing device to send, to the second computing device, the second file at a later time; and based on determining that the second computing device requested the second file before the later time, causing the first computing device to transmit, to the second computing device, the second file.

(M18) A method may be performed as described in paragraph (M17) wherein the summary of the second file comprises header information of the second file.

(M19) A method may be performed as described in paragraph (M17) wherein the later time is based on the second priority level.

(M20) A method may be performed as described in paragraph (M17) wherein determining the bandwidth comprises predicting the bandwidth at a future time when transfer of the first file and the second file is scheduled.

The following paragraphs (A1) through (A20) describe examples of apparatuses that may be implemented in accordance with the present disclosure.

(A1) An apparatus comprising: one or more processors; and memory storing instructions that, when executed by the one or more processors, cause the apparatus to: determine a bandwidth of a network that connects a first computing device and a second computing device; determine a plurality of files for transfer from the first computing device to the second computing device; cause, based on the bandwidth and a first priority level of a first file of the plurality of files, the first computing device to transmit, to the second computing device, the first file; and cause, based on the bandwidth and a second priority level of a second file of the plurality of files, the first computing device to delay transmission, to the second computing device, of the second file for a time period.

(A2) An apparatus as described in paragraph (A1) wherein the second priority level is based on a time when the second file was uploaded to the first computing device.

(A3) An apparatus as described in paragraph (A1) wherein the second priority level is based on a number of times the second file has been accessed.

(A4) An apparatus as described in paragraph (A1) wherein the instructions, when executed by the one or more processors, further cause the apparatus to: determine a relevance of the second file to a user of the second computing device, wherein the second priority level is based on the relevance.

(A5) An apparatus as described in paragraph (A1) wherein the instructions, when executed by the one or more processors, further cause the apparatus to: determine a geographical location of the second computing device, wherein the second priority level is based on the geographical location.

(A6) An apparatus as described in paragraph (A1) wherein the instructions, when executed by the one or more processors, further cause the apparatus to: determine an updated bandwidth corresponding to the network; and cause, based on the updated bandwidth, the first computing device to transmit, to the second computing device, the second file before the time period has elapsed.

(A7) An apparatus as described in paragraph (A1) wherein the instructions, when executed by the one or more processors, further cause the apparatus to: determine, based on a third priority level of a third file of the plurality of files, a threshold; and cause, based on the bandwidth satisfying the threshold, the first computing device to delay transmission, to the second computing device, the third file.

(A8) An apparatus as described in paragraph (A1) wherein the instructions, when executed by the one or more processors, further cause the apparatus to: cause, during the time period, the second computing device to display an indication that the second file is unavailable.

(A9) An apparatus as described in paragraph (A1) wherein the instructions, when executed by the one or more processors, cause the apparatus to determine the bandwidth by predicting the bandwidth at a future time when transfer of the first file and the second file is scheduled.

(A10) An apparatus as described in paragraph (A1) wherein the instructions, when executed by the one or more processors, further cause the apparatus to: receive, from the second computing device, a request for the second file; and cause, based on the request, the first computing device to transmit, to the second computing device, the second file before the time period has elapsed.

(A11) An apparatus comprising: one or more processors; and memory storing instructions that, when executed by the one or more processors, cause the apparatus to: determine a usage pattern of a user of a first computing device during a time period; predict a bandwidth of a network during the time period, wherein the network connects the first computing device and a second computing device, wherein the second computing device stores a plurality of files; cause, based on the bandwidth, the usage pattern, and a first priority of a first file of the plurality of files, the second computing device to transmit, to the first computing device, the first file; and cause, based on the bandwidth, the usage pattern, and a second priority level of a second file of the plurality of files, the second computing device to delay transmission, to the first computing device, of the second file for a second time period.

(A12) An apparatus as described in paragraph (A11) wherein the instructions, when executed by the one or more processors, cause the apparatus to predict the bandwidth of the network based on the usage pattern of the user of the first computing device during the time period.

(A13) An apparatus as described in paragraph (A11) wherein the second priority level is based on one or more of: a time when the second file was uploaded to the second computing device; or a number of times the second file has been accessed.

(A14) An apparatus as described in paragraph (A11) wherein the time period is based on the second priority level.

(A15) An apparatus as described in paragraph (A11) wherein the instructions, when executed by the one or more processors, further cause the apparatus to: receive, from the first computing device, a request for the second file; and cause, based on the request, the second computing device to transmit, to the first computing device, the second file before the time period has elapsed.

(A16) An apparatus as described in paragraph (A11) wherein the instructions, when executed by the one or more processors, cause the apparatus to determine the usage pattern by causing the apparatus to: determine one or more applications that are predicted to be used by the user during the time period, wherein the second priority is based on determining that the one or more applications is configured to use the second file.

(A17) An apparatus comprising: one or more processors; and memory storing instructions that, when executed by the one or more processors, cause the apparatus to: determine a bandwidth of a network that connects a first computing device and a second computing device, wherein the second computing device stores a plurality of files; cause, based on the bandwidth and a first priority level of a first file of the plurality of files, the first computing device to transmit, to the second computing device, the first file; based on the bandwidth and a second priority level of a second file of the plurality of files: cause the first computing device to send, to the second computing device, a summary of the second file; and instruct the first computing device to send, to the second computing device, the second file at a later time; and based on determining that the second computing device requested the second file before the later time, cause the first computing device to transmit, to the second computing device, the second file.

(A18) An apparatus as described in paragraph (A17) wherein the summary of the second file comprises header information of the second file.

(A19) An apparatus as described in paragraph (A17) wherein the later time is based on the second priority level.

(A20) An apparatus as described in paragraph (A17) wherein the instructions, when executed by the one or more processors, cause the apparatus to determine the bandwidth by causing the apparatus to predict the bandwidth at a future time when transfer of the first file and the second file is scheduled.

The following paragraphs (CRM1) through (CRM20) describe examples of computer-readable media that may be implemented in accordance with the present disclosure.

(CRM1) One or more non-transitory computer-readable media storing instructions that, when executed, cause an apparatus to: determine a bandwidth of a network that connects a first computing device and a second computing device; determine a plurality of files for transfer from the first computing device to the second computing device; cause, based on the bandwidth and a first priority level of a first file of the plurality of files, the first computing device to transmit, to the second computing device, the first file; and cause, based on the bandwidth and a second priority level of a second file of the plurality of files, the first computing device to delay transmission, to the second computing device, of the second file for a time period.

(CRM2) One or more non-transitory computer-readable media as described in paragraph (CRM1) wherein the second priority level is based on a time when the second file was uploaded to the first computing device.

(CRM3) One or more non-transitory computer-readable media as described in paragraph (CRM1) wherein the second priority level is based on a number of times the second file has been accessed.

(CRM4) One or more non-transitory computer-readable media as described in paragraph (CRM1) wherein the instructions, when executed, further cause the apparatus to: determine a relevance of the second file to a user of the second computing device, wherein the second priority level is based on the relevance.

(CRM5) One or more non-transitory computer-readable media as described in paragraph (CRM1) wherein the instructions, when executed processors, further cause the apparatus to: determine a geographical location of the second computing device, wherein the second priority level is based on the geographical location.

(CRM6) One or more non-transitory computer-readable media as described in paragraph (CRM1) wherein the instructions, when executed, further cause the apparatus to: determine an updated bandwidth corresponding to the network; and cause, based on the updated bandwidth, the first computing device to transmit, to the second computing device, the second file before the time period has elapsed.

(CRM7) One or more non-transitory computer-readable media as described in paragraph (CRM1) wherein the instructions, when executed, further cause the apparatus to: determine, based on a third priority level of a third file of the plurality of files, a threshold; and cause, based on the bandwidth satisfying the threshold, the first computing device to delay transmission, to the second computing device, the third file.

(CRM8) One or more non-transitory computer-readable media as described in paragraph (CRM1) wherein the instructions, when executed, further cause the apparatus to: cause, during the time period, the second computing device to display an indication that the second file is unavailable.

(CRM9) One or more non-transitory computer-readable media as described in paragraph (CRM1) wherein the instructions, when executed, cause the apparatus to determine the bandwidth by predicting the bandwidth at a future time when transfer of the first file and the second file is scheduled.

(CRM10) One or more non-transitory computer-readable media as described in paragraph (CRM1) wherein the instructions, when executed, further cause the apparatus to: receive, from the second computing device, a request for the second file; and cause, based on the request, the first computing device to transmit, to the second computing device, the second file before the time period has elapsed.

(CRM11) One or more non-transitory computer-readable media storing instructions that, when executed, cause an apparatus to: determine a usage pattern of a user of a first computing device during a time period; predict a bandwidth of a network during the time period, wherein the network connects the first computing device and a second computing device, wherein the second computing device stores a plurality of files; cause, based on the bandwidth, the usage pattern, and a first priority of a first file of the plurality of files, the second computing device to transmit, to the first computing device, the first file; and cause, based on the bandwidth, the usage pattern, and a second priority level of a second file of the plurality of files, the second computing device to delay transmission, to the first computing device, of the second file for a second time period.

(CRM12) One or more non-transitory computer-readable media as described in paragraph (CRM11) wherein the instructions, when executed, cause the apparatus to predict the bandwidth of the network based on the usage pattern of the user of the first computing device during the time period.

(CRM13) One or more non-transitory computer-readable media as described in paragraph (CRM11) wherein the second priority level is based on one or more of: a time when the second file was uploaded to the second computing device; or a number of times the second file has been accessed.

(CRM14) One or more non-transitory computer-readable media as described in paragraph (CRM11) wherein the time period is based on the second priority level.

(CRM15) One or more non-transitory computer-readable media as described in paragraph (CRM11) wherein the instructions, when executed, further cause the apparatus to: receive, from the first computing device, a request for the second file; and cause, based on the request, the second computing device to transmit, to the first computing device, the second file before the time period has elapsed.

(CRM16) One or more non-transitory computer-readable media as described in paragraph (CRM11) wherein the instructions, when executed, cause the apparatus to determine the usage pattern by causing the apparatus to: determine one or more applications that are predicted to be used by the user during the time period, wherein the second priority is based on determining that the one or more applications is configured to use the second file.

(CRM17) One or more non-transitory computer-readable media storing instructions that, when executed, cause an apparatus to: determine a bandwidth of a network that connects a first computing device and a second computing device, wherein the second computing device stores a plurality of files; cause, based on the bandwidth and a first priority level of a first file of the plurality of files, the first computing device to transmit, to the second computing device, the first file; based on the bandwidth and a second priority level of a second file of the plurality of files: cause the first computing device to send, to the second computing device, a summary of the second file; and instruct the first computing device to send, to the second computing device, the second file at a later time; and based on determining that the second computing device requested the second file before the later time, cause the first computing device to transmit, to the second computing device, the second file.

(CRM18) One or more non-transitory computer-readable media as described in paragraph (CRM17) wherein the summary of the second file comprises header information of the second file.

(CRM19) One or more non-transitory computer-readable media as described in paragraph (CRM17) wherein the later time is based on the second priority level.

(CRM20) One or more non-transitory computer-readable media as described in paragraph (CRM17) wherein the instructions, when executed, cause the apparatus to determine the bandwidth by causing the apparatus to predict the bandwidth at a future time when transfer of the first file and the second file is scheduled.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining a bandwidth of a network that connects a first computing device and a second computing device;
   determining a plurality of files for transfer from the first computing device to the second computing device;
   causing, based on the bandwidth and a first priority level of a first file of the plurality of files, the first computing device to transmit, to the second computing device, the first file;
   causing, based on the bandwidth and a second priority level of a second file of the plurality of files, the first computing device to delay transmission, to the second computing device, of the second file for a time period; and
   transmitting, to the second computing device and before the end of the time period, a portion of the second file.

2. The method of claim 1, wherein the portion of the second file comprises a summary of the second file.

3. The method of claim 1, wherein the second file comprises an image, and wherein the portion of the second file comprises a thumbnail of the image.

4. The method of claim 1, further comprising:
   determining a relevance of the second file to a user of the second computing device, wherein the second priority level is based on the relevance.

5. The method of claim 1, further comprising:
   determining a geographical location of the second computing device, wherein the second priority level is based on the geographical location.

6. The method of claim 1, further comprising:
   determining an updated bandwidth corresponding to the network; and
   causing, based on the updated bandwidth, the first computing device to transmit, to the second computing device, the second file before the time period has elapsed.

7. The method of claim 1, further comprising:
   determining, based on a third priority level of a third file of the plurality of files, a threshold; and
   causing, based on the bandwidth satisfying the threshold, the first computing device to delay transmission, to the second computing device, the third file.

8. The method of claim 1, further comprising:
   causing, during the time period, the second computing device to display an indication that the second file is unavailable.

9. The method of claim 1, wherein determining the bandwidth comprises predicting the bandwidth at a future time when transfer of the first file and the second file is scheduled.

10. The method of claim 1, further comprising:
    receiving, from the second computing device, a request for the second file; and causing, based on the request, the first computing device to transmit, to the second computing device, the second file before the time period has elapsed.

11. A method comprising:
   determining a usage pattern of a user of a first computing device during a time period;
   predicting a bandwidth of a network during the time period, wherein the network connects the first computing device and a second computing device, wherein the second computing device stores a plurality of files;
   causing, based on the bandwidth, the usage pattern, and a first priority of a first file of the plurality of files, the second computing device to transmit, to the first computing device, the first file;
   causing, based on the bandwidth, the usage pattern, and a second priority level of a second file of the plurality of files, the second computing device to delay transmission, to the first computing device, of the second file for a second time period; and
   causing the second computing device to transmit, to the first computing device and before the end of the second time period, a portion of the second file.

12. The method of claim 11, wherein predicting the bandwidth of the network is based on the usage pattern of the user of the first computing device during the time period.

13. The method of claim 11, wherein the second priority level is based on one or more of:
   a time when the second file was uploaded to the second computing device; or
   a last modified date of the second file.

14. The method of claim 11, wherein the time period is based on the second priority level.

15. The method of claim 11, further comprising:
   receiving, from the first computing device, a request for the second file; and
   causing, based on the request, the second computing device to transmit, to the first computing device, the second file before the time period has elapsed.

16. The method of claim 11, wherein determining the usage pattern comprises:
   determining one or more applications that are predicted to be used by the user during the time period, wherein the second priority level is based on determining that the one or more applications is configured to use the second file.

17. A method comprising:
   determining a bandwidth of a network that connects a first computing device and a second computing device, wherein the second computing device stores a plurality of files;
   causing, based on the bandwidth and a first priority level of a first file of the plurality of files, the first computing device to transmit, to the second computing device, the first file;
   based on the bandwidth and a second priority level of a second file of the plurality of files:
      causing the first computing device to send, to the second computing device, a summary of the second file, wherein the summary comprises a portion of the second file; and
      instructing the first computing device to send, to the second computing device, the second file at a later time; and
   based on determining that the second computing device requested the second file before the later time, causing the first computing device to transmit, to the second computing device, the second file.

18. The method of claim 17, wherein the summary of the second file comprises header information of the second file.

19. The method of claim 17, wherein the later time is based on the second priority level.

20. The method of claim 17, wherein determining the bandwidth comprises predicting the bandwidth at a future time when transfer of the first file and the second file is scheduled.

* * * * *